L. HUGHES.
FENDER.
APPLICATION FILED AUG. 29, 1918.

1,295,034.

Patented Feb. 18, 1919.

INVENTOR.
Llewelyn Hughes.
BY Hazard & Miller
ATTORNEYS.

UNITED STATES PATENT OFFICE.

LLEWELYN HUGHES, OF PASADENA, CALIFORNIA.

FENDER.

1,295,034.  Specification of Letters Patent.  Patented Feb. 18, 1919.

Application filed August 29, 1918. Serial No. 251,971.

*To all whom it may concern:*

Be it known that I, LLEWELYN HUGHES, a citizen of the United States, residing at Pasadena, in the county of Los Angeles and State of California, have invented new and useful Improvements in Fenders, of which the following is a specification.

My object is to make a mud guard especially adapted for use upon the rear wheels of a motor vehicle, and my invention consists of the novel features herein shown, described and claimed.

Figure 1:
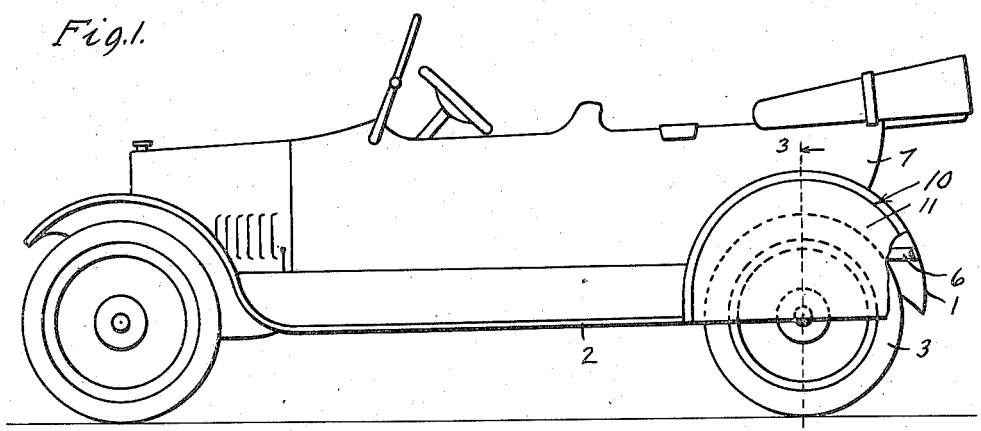
Figure 1 is a side elevation of a motor vehicle provided with a mud guard embodying the principles of my invention.
Figure 2:
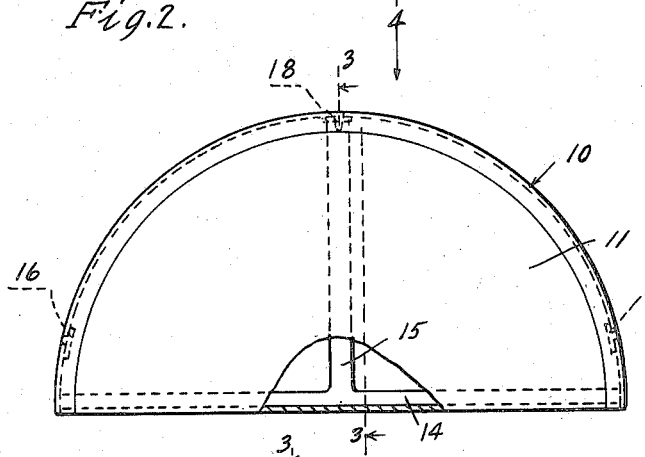
Fig. 2 is an enlarged outside elevation of the mud guard removed from the motor vehicle, as seen looking in the direction of the arrows 2 in Figs. 3 and 4.
Figure 3:
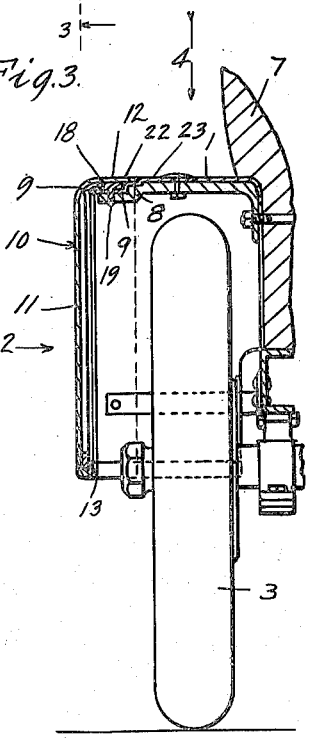
Fig. 3 is a vertical cross section on the lines 3—3 of Figs. 1, 2 and 4.
Figure 4:
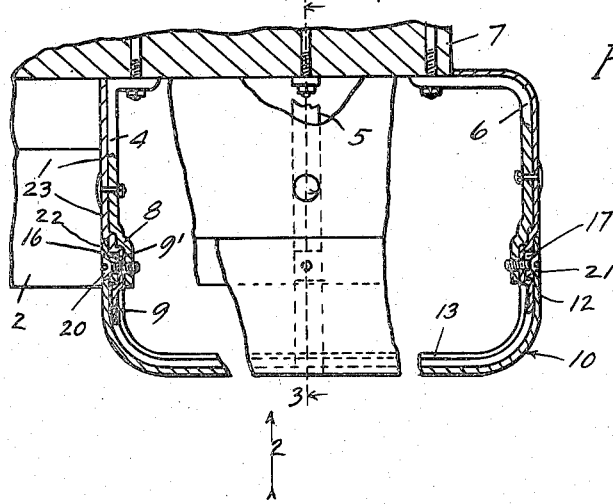
Fig. 4 is a top plan view as indicated by the arrows 4 in Figs. 2 and 3, parts being broken away and shown in section.

The mud guard construction includes a sheet metal plate 1 bent to a semicircle and adapted to extend from the rear end of the running board 2 upwardly and backwardly over the rear wheel 3, and braces 4, 5 and 6 adapted for attachment to the body 7, and to the plate 1 to support the plate. The outer ends 8 of the braces 4, 5 and 6 are offset inwardly, and the outer edge 9 of the plate 1 is offset inwardly to the extent of the thickness of the metal and has depressions 9' fitting against the offset portions 8 of the braces.

The side plate 10 covers the horizontal opening from the wheel 3 outwardly under the plate 1, and is intended to prevent mud, water, and the like, from flying outwardly from the wheel and to cause the direct rays of the sun to throw a shadow upon the larger portion of the wheel.

The details of the side plate 10 are as follows:

A piece of sheet metal is cut and formed to produce the semicircular flat plate 11, the flange 12 extending from the circular edge of the plate 11 and the inturned flange 13 extending from the straight edge of the plate 11. Pieces of heavy strap iron are shaped to form the brace 14 held in place by the inturned flange 13, and the brace 15 extending from the center of the brace 14 upwardly across the plate 11 and inwardly across the flange 12. The brace 14 not only extends along the lower edge of the flat plate 11, but along the lower edges of the ends of the flange 12.

Holes are drilled and tapped through the depressions 9' and through the offset portions 8 of the braces 4, 5 and 6. Then the side plate 10 is prepared with reinforcements 16 and 17 welded against the inner faces of the flange 12 to fit in the depressions 9' in opposition to the offset ends 8 of the braces 4 and 6, and a reinforcement 18 is welded to the inner face of the flange 12 to fit in the depression 9' in opposition to the offset portion 8 of the brace 5, and a stud 19 extends from the reinforcement 18 through the depression 9' and through the end of the brace 5, and bolts 20 and 21 are inserted through the flange 12, through the reinforcements 16 and 17, through the depression 9' and tapped into the offset ends 8 of the braces 4 and 6, so as to hold the side plate 10 securely in place. The flange 12 overlaps the offset portion 9 of the plate 1, so that the outer face 22 of the flange 12 will be flush with the outer face 23 of the plate 1.

The mud guard thus constructed improves the appearance of the motor vehicle, braces itself, protects the wheel 3 from the sun, and from anything coming from the outside that would produce injury, and makes a pocket around the upper half of the wheel 3 to prevent water and mud from flying from the wheel outwardly.

This mud guard is especially desirable in cities and among crowds of people, as it prevents the water, mud and slush from flying outwardly from the rear wheels upon sidewalks and pedestrians which would otherwise be within range of the flying material.

Furthermore, my mud guard construction protects from fifty to sixty-five per cent. of the tire depending on the construction of the car, from the sun light, thereby prolonging the life of the tire.

Various changes may be made without departing from the spirit of my invention as claimed.

I claim:

1. A mud guard comprising a sheet metal plate bent sidewise to a semicircle and adapted to extend from the rear end of a running board upwardly and backwardly over a rear wheel; braces adapted for attachment to the vehicle body and extending under the sheet metal plate, the outer ends of the braces being offset inwardly, and the outer edge of the sheet metal plate being offset inwardly to the extent of the thickness of the metal; a piece of sheet metal cut and formed to produce a semicircular flat plate having a flange extending from the circular edge and fitting the offset portion of the curved sheet metal plate; and screws inserted through the flange and tapped into the braces.

2. A mud guard comprising a sheet metal plate bent sidewise to a semicircle and adapted to extend from the rear end of a running board upwardly and backwardly over a rear wheel; braces adapted for attachment to the vehicle body and extending under the sheet metal plate, the outer ends of the braces being offset inwardly, and the outer edge of the sheet metal plate being offset inwardly to the extent of the thickness of the metal and fitting the offset portions of the braces; a piece of sheet metal cut and formed to produce a semicircular flat plate having a flange extending from the circular edge and having an inturned flange extending from the straight edge; a piece of strap iron held in place by the inturned flange; a brace extending from the center of the strap iron upwardly and inwardly to the center brace; reinforcements secured along the inner face of the curved flange and fitting the offset portions of the curved plate; and means for holding the parts together.

In testimony whereof I have signed my name to this specification.

LLEWELYN HUGHES.